US006247317B1

(12) United States Patent
Kostka

(10) Patent No.: US 6,247,317 B1
(45) Date of Patent: Jun. 19, 2001

(54) FUEL NOZZLE HELICAL COOLER

(75) Inventor: Richard Alan Kostka, Maple (CA)

(73) Assignee: Pratt & Whitney Canada Corp., Lonqueuil (CA)

( * ) Notice: Subject to any disclaimer, the term of this patent is extended or adjusted under 35 U.S.C. 154(b) by 0 days.

(21) Appl. No.: 09/577,578

(22) Filed: May 25, 2000

Related U.S. Application Data

(62) Division of application No. 09/083,199, filed on May 22, 1998, now Pat. No. 6,082,113.

(51) Int. Cl.[7] ..................... F02C 1/00
(52) U.S. Cl. ..................... 60/741
(58) Field of Search ..................... 60/741, 740, 742

(56) References Cited

U.S. PATENT DOCUMENTS 1,875,457 9/1932 Hemmingsen .
3,076,607 2/1963 Cordier .
3,129,891 4/1964 Vdoviak .
4,491,272 1/1985 Bradley et al. .
5,127,346 7/1992 Kepplinger et al. .
6,141,968 * 11/2000 Gates ..................... 60/740

FOREIGN PATENT DOCUMENTS 493434 11/1938 (GB) .

* cited by examiner

*Primary Examiner*—Timothy S. Thorpe
*Assistant Examiner*—Ehud Gartenberg
(74) *Attorney, Agent, or Firm*—Jeffrey W. Astle

(57) ABSTRACT

A fuel injector for a gas turbine engine, including an axial fuel chamber and a spiral metering valve in the chamber.

2 Claims, 8 Drawing Sheets

FUEL NOZZLE HELICAL COOLER

CROSS-REFERENCE TO RELATED APPLICATION

This application is a divisional application of Ser. No. 09/083,199, filed May 22, 1998, now U.S. Pat. No. 6,082,113.

BACKGROUND OF THE INVENTION

1. Field of the Invention

The present invention relates to gas turbine engines, and more particularly, to a fuel injector for such engines.

2. Description of the Prior Art

The combustion chamber of certain gas turbine engines may be an annular tube with a plurality of fuel injectors or nozzles that are spaced apart circumferentially. Each fuel injector in such an arrangement must be efficient and provide a proper distribution of an atomized fuel and air mixture in the zone surrounding the particular injector. Preferably this mixture is distributed as a conical spray. It is also important that the fuel be atomized in order to promote efficient burning of the fuel in the combustion chamber. The control of the spray cone can be effected by providing a swirl to the mixture as it leaves the injector. The swirl can be provided by deflectors or directing air jets to provide a vortex. However, such devices are often spaced apart from the actual fuel nozzles forming part of the fuel injector.

U. S. Pat. 5,579,645, issued Dec. 3, 1996 to the applicant, describes a fuel nozzle having first and second annular air passages and an annular fuel passage between the first and second air passages. The result is a conical air-fuel-air sandwich which greatly enhances the formation of atomized fuel droplets in order to improve the efficient burning of the fuel. It has been found that in some cases the spray cone formed by the nozzle is too wide and results in wall impingement. Therefore, there is a need to control the angle and pattern of the spray cone.

SUMMARY OF THE INVENTION

It is, therefore, an aim of the present invention to provide an improved fuel injector that answers some of the needs that have been identified but is not presently being addressed by existing fuel injector technology.

It is also advantageous to provide a higher air-to-fuel ratio; yet given the constraints with present fuel injector designs, it is difficult to increase this ratio.

It is a further aim of the present invention to design a fuel injector for a gas turbine that has a compact arrangement of nozzles and passages for supplying both air and fuel to form a diverging spray of a mixture of atomized fuel and air with an increased air-to-fuel ratio.

It is a further aim of the present invention to provide a more controlled spray shape.

In a construction in accordance with the present invention, there is a fuel injector for a combustor in a gas turbine engine, wherein the fuel injector includes a fuel tip protruding inwardly of the combustor along a tip axis and defining a primary fuel nozzle along the tip axis, a valve for metering the fuel through the primary fuel nozzle of the fuel injector, the valve comprising a spiral vane disposed within a fuel chamber in the tip to provide a spiral fuel flow path through a portion of the fuel chamber to the primary fuel nozzle, wherein the primary fuel nozzle is used for ignition purposes.

In another aspect of the present invention, there is a fuel injector for a combustor in a gas turbine engine, wherein the combustor includes a combustor wall defining a combustion chamber tube surrounded by pressurized air, the injector comprising an injection tip assembly adapted to protrude, in use, through the combustor wall into the chamber, the injector tip including a first air passage forming an annular array communicating the pressurized air from outside the wall into the combustion chamber, a second air passage made up of an annular array of individual air passages spaced radially from the first air passage for communicating pressurized air from outside the wall into the combustion chamber, a first fuel gallery extending through the fuel injector tip and defining an annular fuel nozzle between the first air passage and the second air passages whereby the second air passage is arranged to atomize the fuel emanating from the first fuel nozzle, and a set of third air passages arranged in annular array in the injector tip spaced radially outwardly from the second air passages whereby air from the third passages is arranged to shape the spray of the mixture of atomized fuel and air and to add supplemental air to the mixture.

In a more specific embodiment of the present invention, there is provided a fuel tip with a second fuel gallery communicating with an axial fuel nozzle concentric and central to the first air passage, wherein the second fuel gallery is effective to supply primary fuel for ignition purposes.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
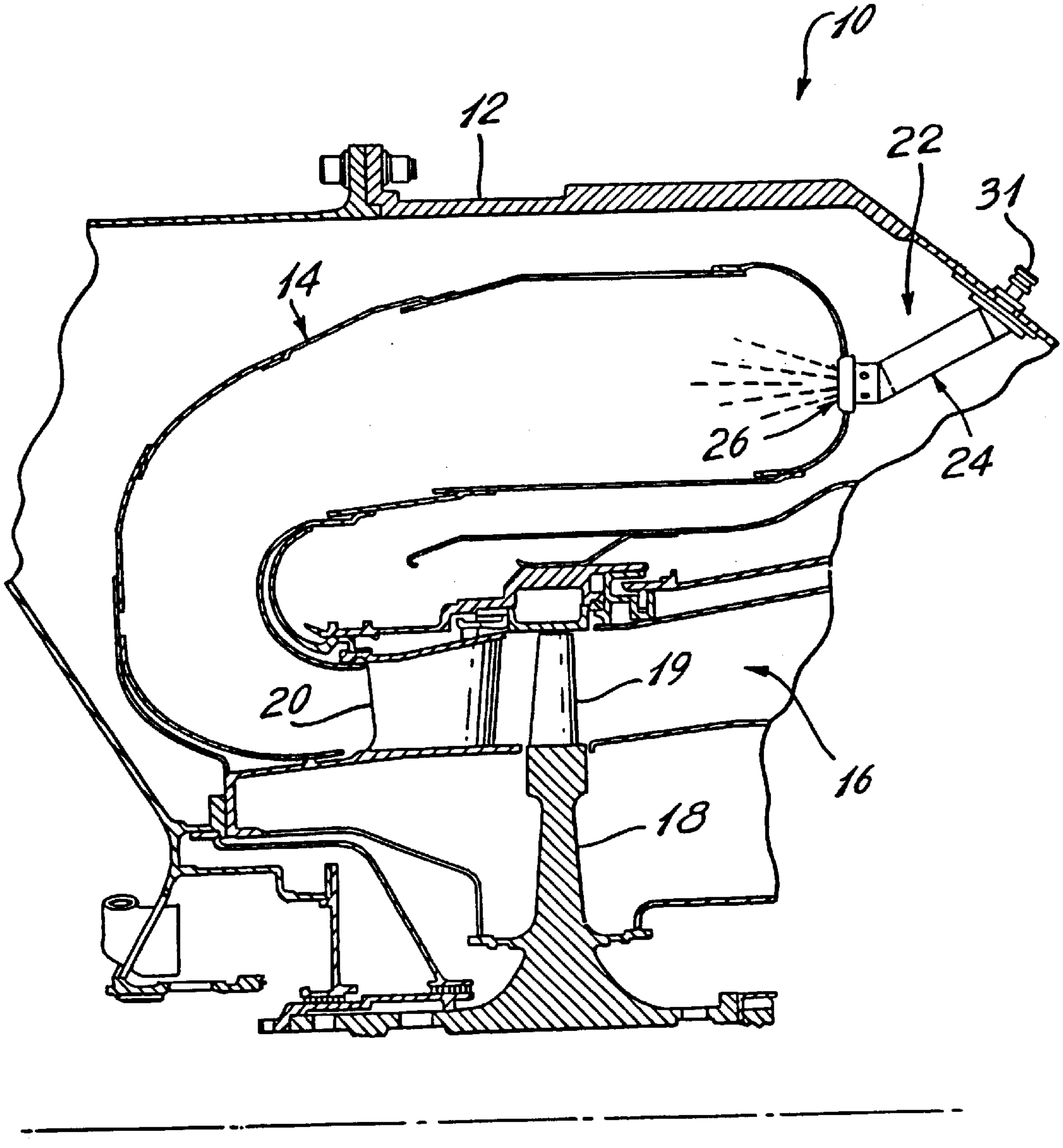
FIG. 1 is a simplified axial cross-section of the combustor of a gas turbine engine which includes the present invention.

Referring now to the drawings, FIG. 1 shows a combustor section 10 which includes an annular casing 12 and an annular combustor tube 14 concentric with a turbine section 16. The turbine section 16 is shown with a typical rotor 18 having blades 19 and a stator vane 20 upstream from the blades 19.

Figure 2:
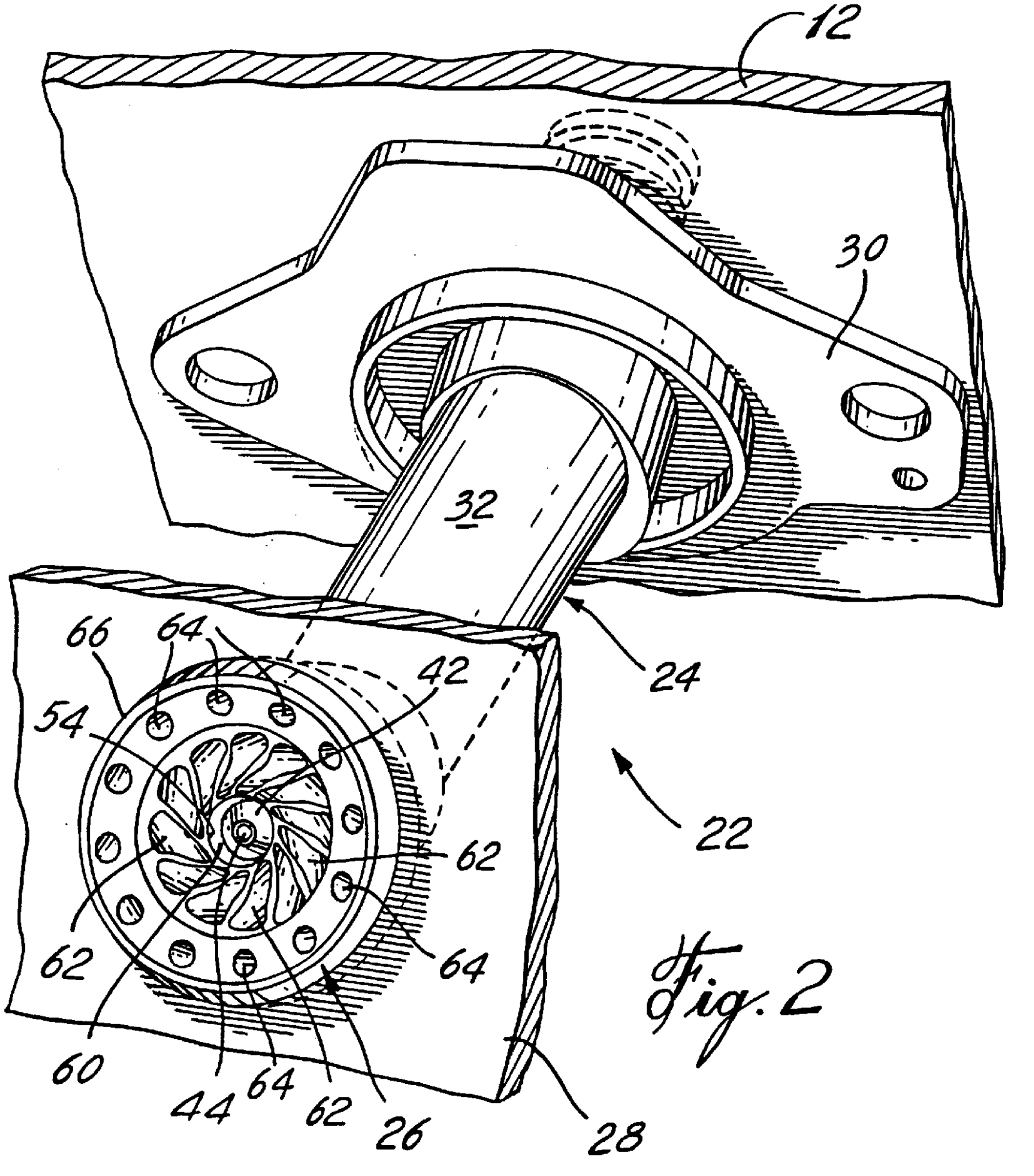
FIG. 2 is an enlarged perspective view of an embodiment of the present invention.

A fuel injector 22, part of the present invention, is shown in FIGS. 1 and 2 as being located at the end of the annular combustor tube 14 and directed axially thereof. The injector 22 is mounted to the casing 12 by means of a bracket 30. The injector includes a fitting 31 to be connected to a typical fuel line. There may be several fuel injectors 22 located on the wall 28 of the combustion chamber, and they may be circumferentially spaced apart. For the purpose of the present description, only one fuel injector 22 will be described. The fuel injector 22 includes a stem portion which may be of the type described in U. S. Pat. Application 08/960,331, filed Oct. 29, 1997, now U.S. Pat. 6,141,968 entitled "Fuel Nozzle for Gas Turbine Engine", assigned to the applicant, and which is herein incorporated by reference. A shield 32 surrounds the stem 24.

Figure 3:
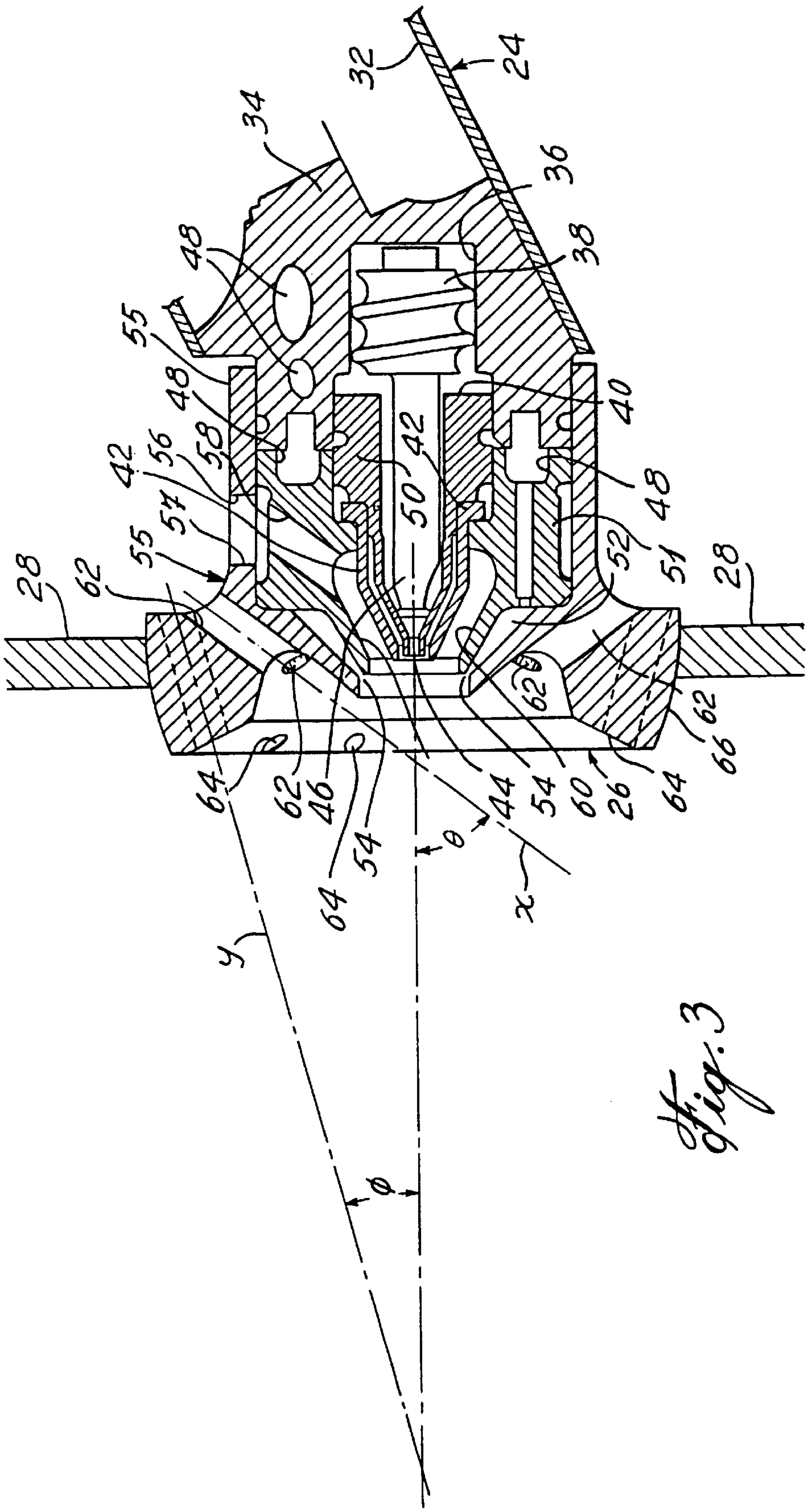
FIG. 3 is a fragmentary, enlarged, crosssectional, axial view of the embodiment shown in FIG. 2.

The fuel injector 22 also includes an injector tip 26 which is mounted to the combustor wall 28, as shown in FIGS. 2 and 3. Only the front face of the tip 26 extends within the combustion chamber while most of the tip 26 is in the cooling air passage outside wall 28.

The injector tip 26 includes a machined body 34. An axial recess in the body 34 defines the primary fuel chamber 36. An insert 50 provided within the recess defines the nozzle opening 44 communicating with the fuel chamber 36 for passing the primary fuel. A valving device 38 includes a spiral vane which causes the primary fuel to swirl within the chamber 36. The stem 46 of this valving device acts as a metering valve for the primary fuel as it exits through the nozzle 44. The primary fuel is used mainly for ignition purposes.

A heat shield 42 surrounds the tip of the insert 50, and in particular, surrounds the nozzle opening 44. The heat shield 42 fits onto the insert 50.

A second annular insert 51 is mounted to the body 34 concentrically of the insert 50 and forms part of the secondary fuel distribution gallery and nozzle. The secondary fuel passes through somewhat spiral passages making up the fuel gallery 48. The purpose of circulating the secondary fuel in this fashion is to keep the fuel spinning in the passages, thus eliminating stagnant zones in the fuel gallery in order to prevent coking and also to help cool the injector. The secondary fuel is eventually delivered to an annular fuel nozzle 54 which is also a swirler to provide the swirl to the secondary fuel. The secondary fuel sustains the combustion in the combustor after the fuel has been ignited.

The fuel nozzle 54 is formed by the insert 51 and a cylindrical tubular head 55 which fits onto the tip body 34 and is concentric with the inserts 50 and 51. The head 55 includes openings which define the core air passage which in turn communicates with core air swirler passages 58 in the insert 51. These core air passages 58 can communicate with core air channel 60 to pass pressurized air coming from the cooling air between the casing and the combustor wall, to enter into the combustor. Theoretically, the core air coming out of channel 60 is concentric and inward of the annular film of secondary fuel exiting from the nozzle 54.

A second row of annular air passages 62 is also provided in the head 55 and communicates with the pressurized cooling air immediately outside of the combustor wall 28. The individual passages 62 are generally designed to provide a swirl to the mix of air and fuel, and, in fact, the purpose of the pressurized air coming through the passages 62 is to atomize the secondary fuel film exiting from the nozzle 54. The passages 62 each have an axis x. The passages 62 have a swirl angle which is defined by axis x lying in a plane parallel to and offset a distance D from a plane through the center line CL of the tip 26, angled inwardly in that offset parallel plane to the center line CL. The offset is represented by the distance D in FIG. 4*a*, and the angle of inclination of axis x to center line CL is shown as $\theta$ in FIG. 3, where the plane of cross-section of FIG. 3 is parallel to the plane in which axis x lies being offset D from the plane through the center line CL.

As shown in FIGS. 2 to 4*a*, the tip head 55 is provided with a third annular row of air passages referred to as auxiliary air passages 64. As seen in these drawings, the air passages are straight bores through enlarged ring 66 of the head 55. Each passage 64 has an axis y. The passages 64 may be defined in the same manner as the passages 62, that is, by axis y lying in a plane parallel to and offset a distance $D_1$ from a plane through the center line CL of the tip 26, angled inwardly in that offset plane to the center line CL. The offset is represented by the distance $D_1$ in FIG. 4*a*, and the angle of inclination of axis y to the center line CL is shown as $\phi$ in FIG. 3. The passages 64 also communicate with the cooling air, such air being pressurized relative to the atmosphere within the combustor.

Figure 6:
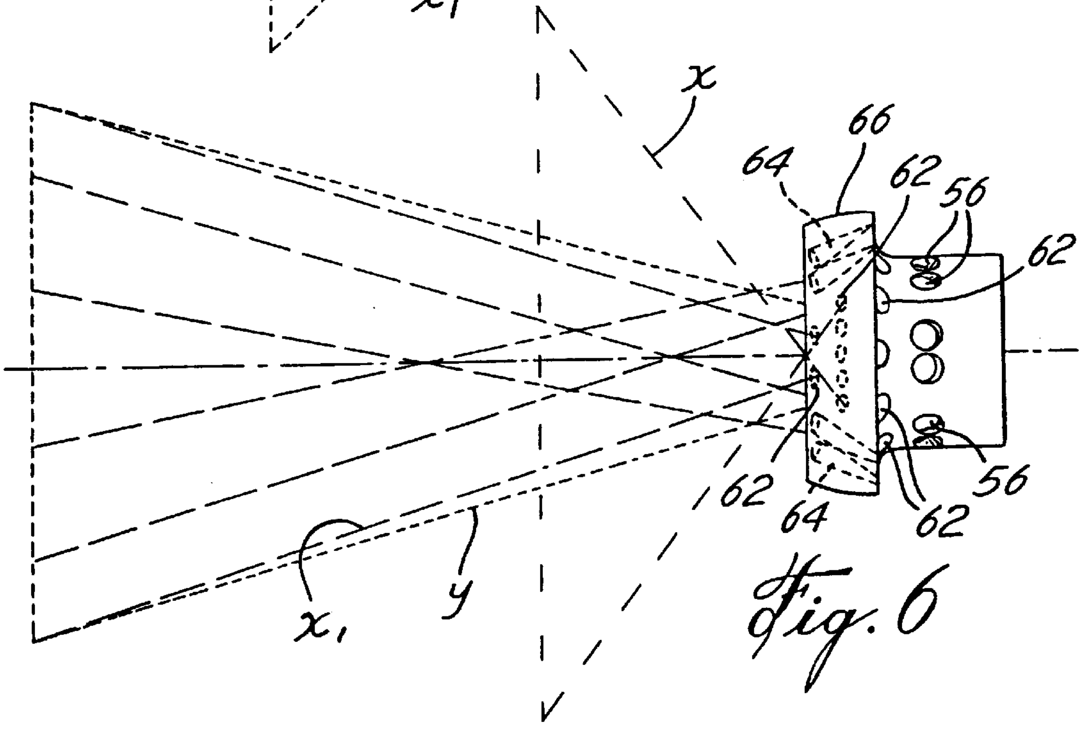
FIG. 6 is a schematic view showing the flow of air and atomized fuel and the containment provided by an embodiment of the present invention.

The main purpose of the pressurized air passing through the passages 64 is to shape the cone of the fuel mixture being ejected from the face of the tip 26. The passages 64 can be provided such as to reduce the divergent angle of the cone and this can be customized to the combustor design. The schematic illustration in FIG. 6 attempts to illustrate this phenomenon. The cone is represented by axes x and represents the cone of atomized spray of fuel and air, given the angle $\theta$ of the passages 62, shown in FIGS. 3 and 4*a*. However, the air passages 64 provide pressurized air forming a cone at a much smaller angle represented by the axes y in FIG. 6, to shape the atomized fuel cone, as shown at $x_1$. Accordingly, the passages 64 will allow pressurized air to enter into the combustor in a spiral conical form influencing the spray distribution of the atomized fuel and pressurized air passing through nozzles or air passages 62.

It is also noted that the addition of the auxiliary air from passage 64 increases the availability of air in the fuel air mixture, thereby raising the air fuel ratio.

Figure 4A:
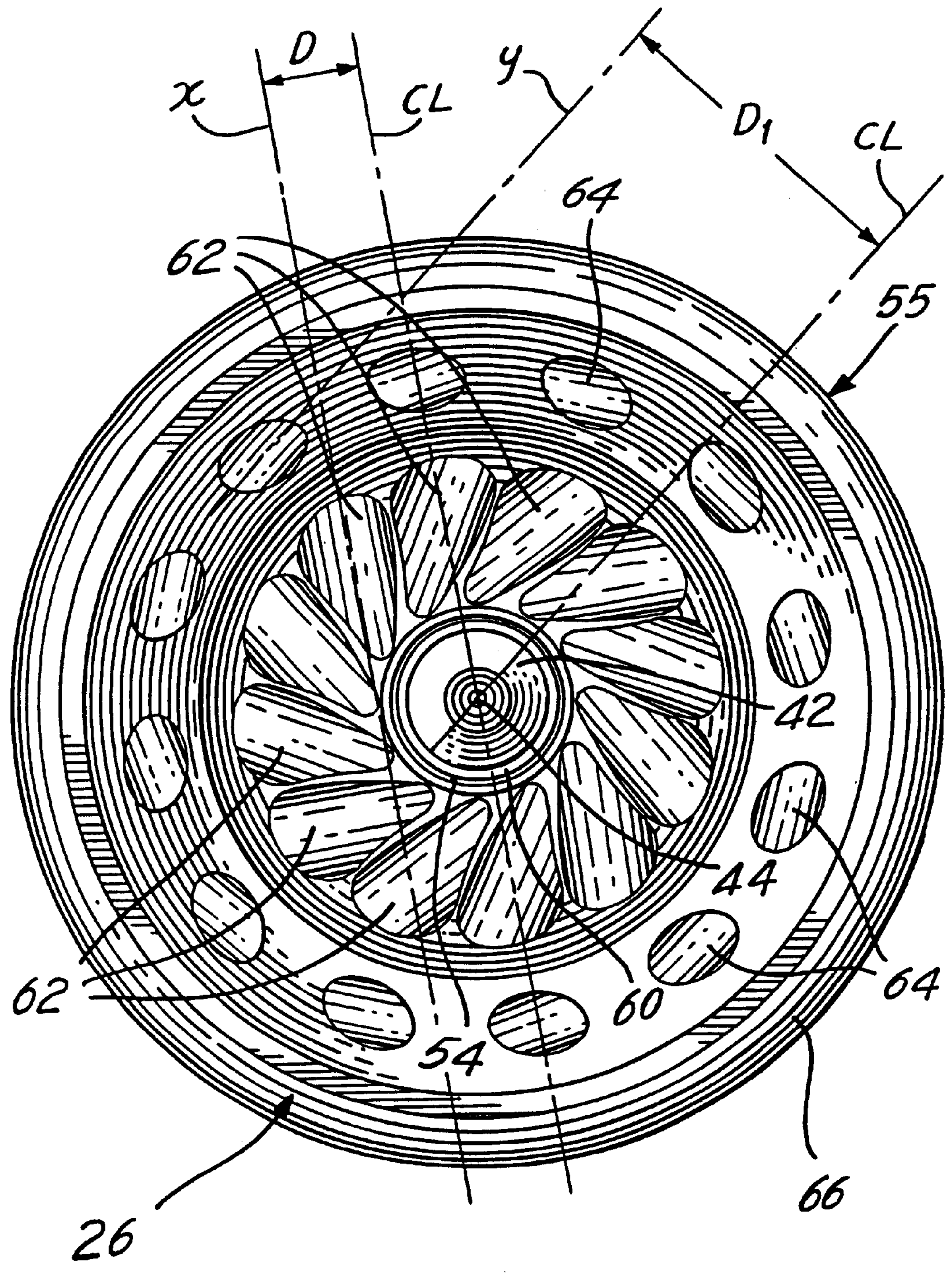
FIG. 4*a* is a front elevation of the fuel injector shown in FIGS. 2 and 3.
Figure 4B:
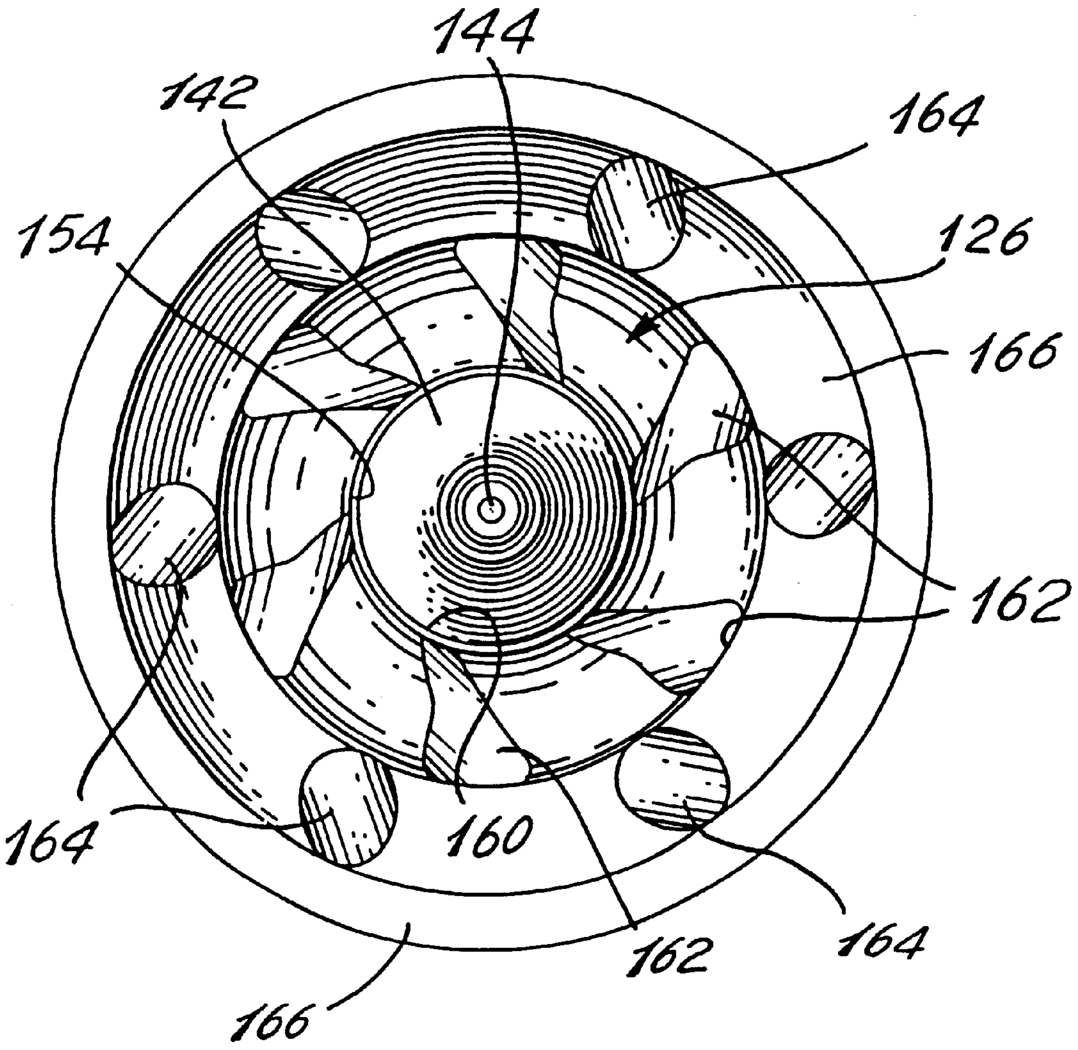
FIG. 4*b* is a front elevation of the fuel injector in accordance with the present invention but showing a different embodiment thereof.
Figure 7:
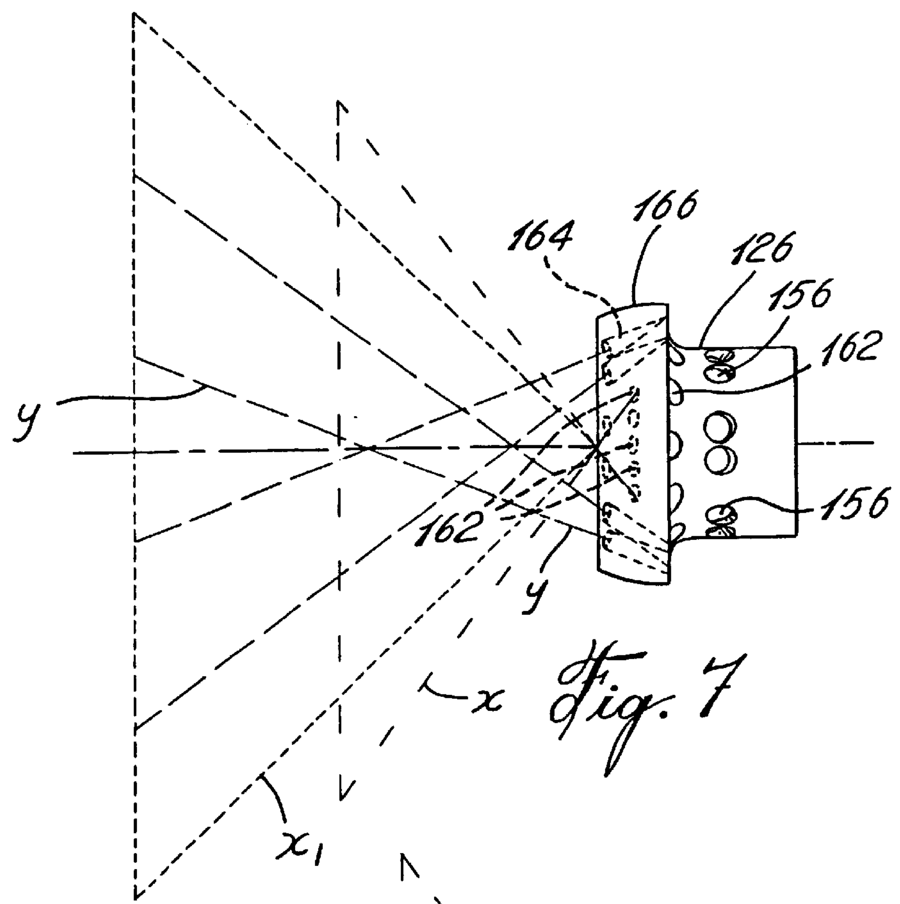
FIG. 7 is a schematic view, similar to FIG. 6, and showing the effect of a different arrangement of the present invention.

Within the formula provided hereinabove, the angle $\theta$ of the passage 62 and angle $\phi$ of passage 64 can be varied to provide different shapes. FIG. 7 is an embodiment based on the tip 126, shown in FIG. 4*b*. As shown in FIG. 4*b*, the tip 126 includes passages 162 formed in the head 155 which are different in angle from those shown in FIG. 4*a*. The spray cone is represented in FIG. 7. The air passages 164, as shown in FIGS. 4*b* and 7, are angled to provide a more closed shaped cone $x_1$ by means of the air following axes y and shaping the cone formed by axes x to ultimately form the cone $x_1$.

Figure 4C:
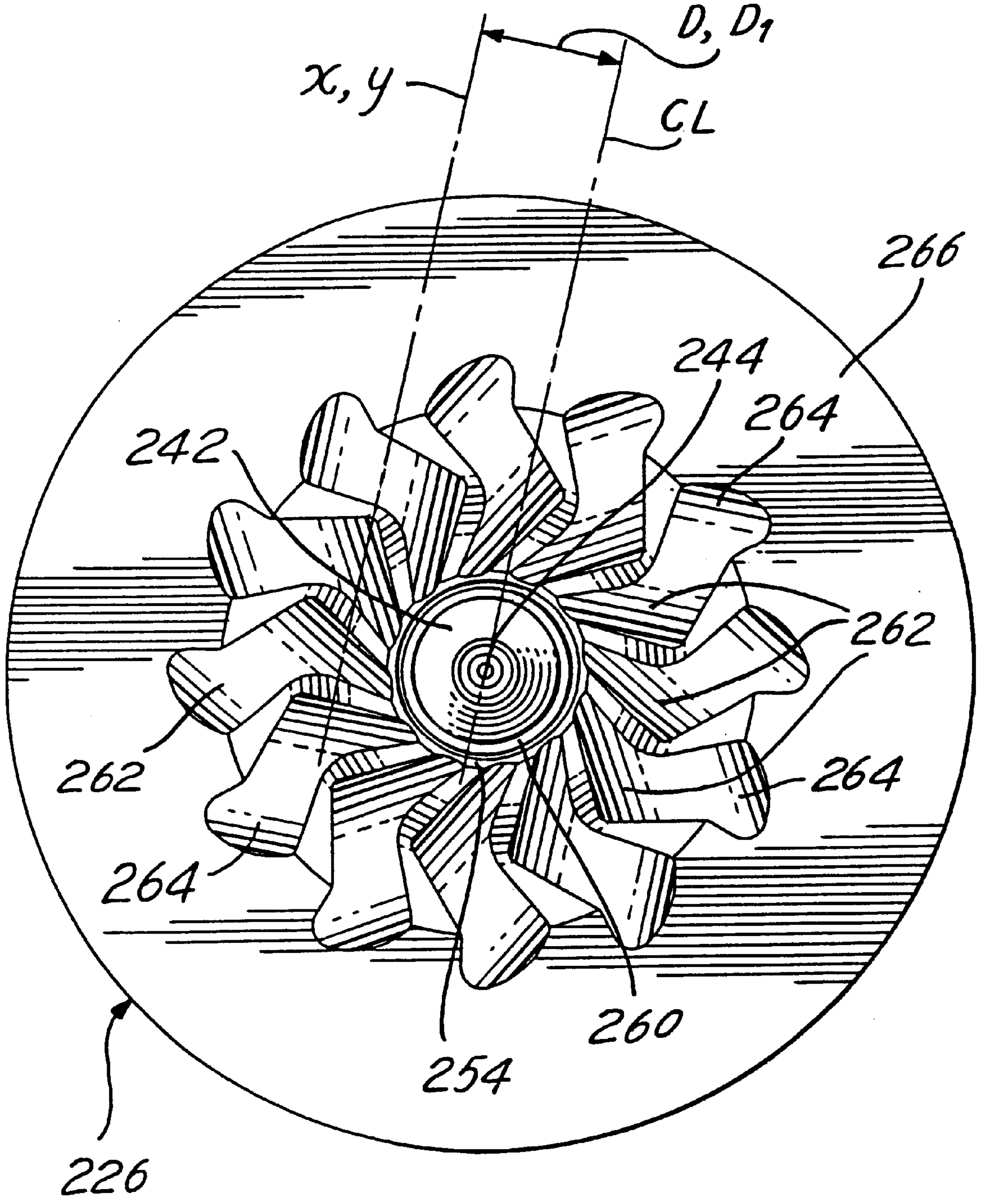
FIG. 4*c* is a front elevation, similar to FIGS. 4*a* and 4*b*, but showing yet another embodiment thereof.
Figure 5:
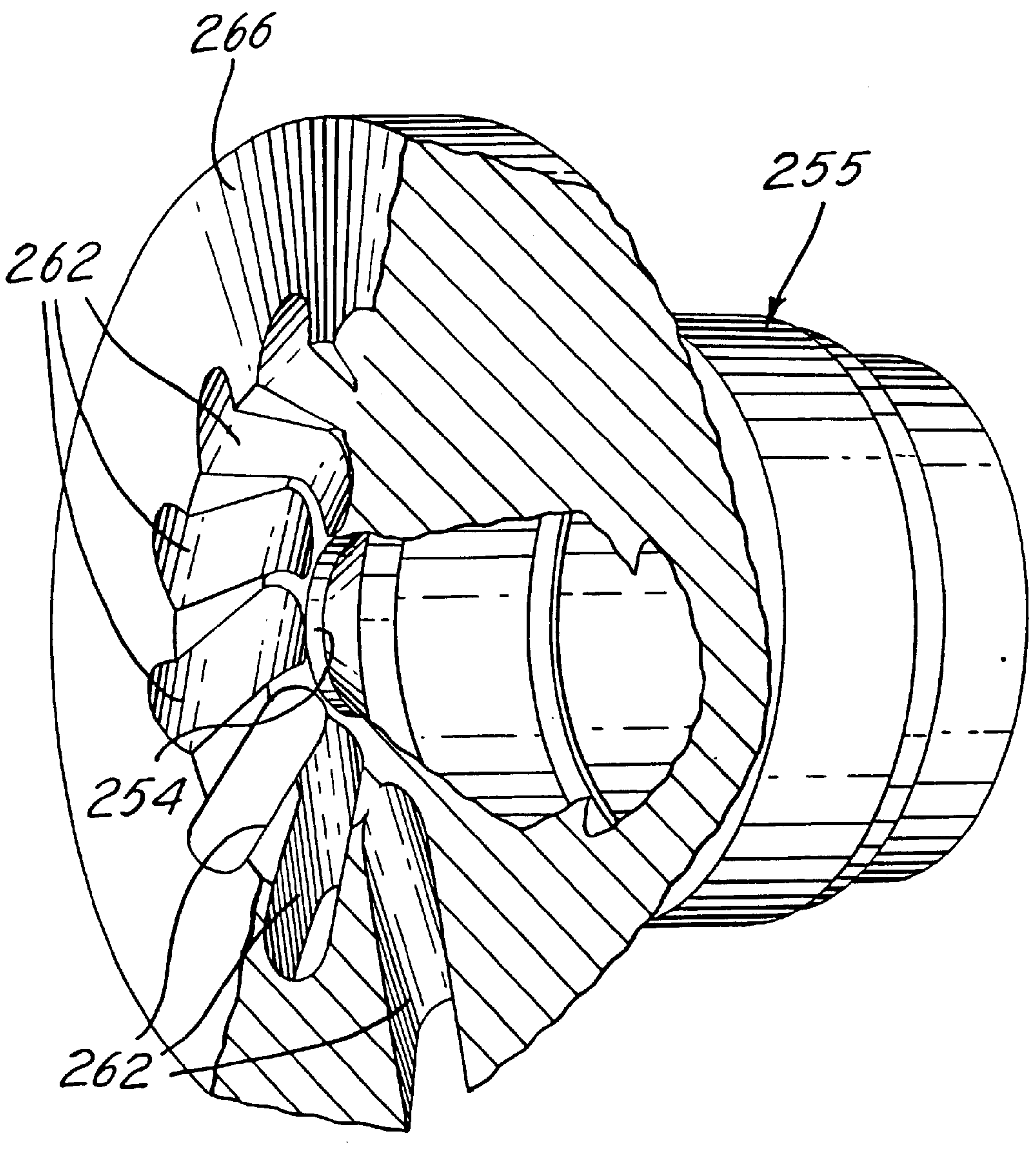
FIG. 5 is a fragmentary perspective view of the embodiment shown in FIG. 4*c;*

FIGS. 4*c* and 5 define a further embodiment of a fuel injector tip 226. FIG. 5 merely shows the head 255 and not the complete tip. In any event, air passages, which would normally be separated as shown in FIGS. 4*a* and 4*b*, are herein merged to form more extensive slots 262, 264 piercing the ring 266 and extending to the fuel nozzle 254. Thus, according to the above formula, the passages 264 have the same offset, that is, the distance $D = D_1$ and the offset planes coincide. Furthermore, $\angle\theta = \angle\phi$. The slots 262, 264 provide a much greater input of air compared to prior art tips.

The passages 62, 64, 162, 164, and slots 262, 264 may be of different cross-sectional shapes and not necessarily formed as circular cylindrical bores. Naturally, the passages may be formed by presently known techniques. Such techniques include milling and brazing, electro discharge or laser.

What is claimed is:

1. A fuel injector for a combustor in a gas turbine engine, the injector having an injector tip assembly, the injector tip assembly having a tip axis and comprising a machined body having a central axial recess defining a fuel chamber, an insert member including an axial nozzle for passing fuel to the combustor, and a valve for metering the fuel through the axial nozzle, the valve comprising a spiral vane disposed within the fuel chamber to provide a spiral fuel flow path through a portion of the fuel chamber to the nozzle.

2. A fuel injector for a combustor in a gas turbine engine as defined in claim 1, wherein the injector tip protrudes within the combustor and the spiral vane is coaxial with the tip axis passing through the axial nozzle, the valve further including a stem which extends into the axial nozzle along the tip axis to block the axial nozzle when primary fuel is not required.

* * * * *